United States Patent [19]
Inoue et al.

[11] Patent Number: 5,469,318
[45] Date of Patent: Nov. 21, 1995

[54] MAGNETIC HEAD DEVICE WITH A CLEANING MECHANISM

[75] Inventors: Naoto Inoue; Kiyotaka Yamaguchi, both of Yamagata, Japan

[73] Assignee: Mitsumi Electric Co., Ltd., Tokyo, Japan

[21] Appl. No.: 279,792

[22] Filed: Jul. 25, 1994

[30] Foreign Application Priority Data

Aug. 31, 1993 [JP] Japan ................... 5-52011 U

[51] Int. Cl.⁶ ............................ G11B 5/41
[52] U.S. Cl. .................................. 360/128
[58] Field of Search ............................ 360/128

[56] References Cited

FOREIGN PATENT DOCUMENTS

531162A2 10/1993 European Pat. Off. ............ 360/128
5-67318 3/1993 Japan ................................ 360/128

Primary Examiner—A. J. Heinz
Attorney, Agent, or Firm—Whitham, Curtis, Whitham & McGinn

[57] ABSTRACT

A magnetic head device with a cleaning mechanism includes: a head mounting stand including a head setting space in which a magnetic head is set, and tape guides for regulating the running of a magnetic tape, a lever which is swingably supported by a shaft on the upper surface of the rear end portion of the head mounting stand, a cleaning member embedded in the inner surface of the front end portion of the lever which is bent, and a drive member engaged with the rear end portion of the lever to swing the lever, the cleaning member being slidably moved on the front surface of the magnetic head. In the device, the shaft and the head mounting stand are formed as one unit.

7 Claims, 4 Drawing Sheets

MAGNETIC HEAD DEVICE WITH A CLEANING MECHANISM

BACKGROUND OF THE INVENTION

1. Field of the Invention

This invention relates to a magnetic head device which is built, for instance, in a tape recorder and has an automatic cleaning mechanism.

2. Related Art

If foreign matter such as dust and magnetic powder stick onto the front surface of a magnetic head, they may decrease the sensitivity of the magnetic head and shorten the service life thereof. In order to maintain the front surface of the magnetic head clean at all times, the foreign matter is manually wiped off with cloth wound on the finger tip or with a swab. Alternatively, a cleaning tape or a special cleaning brush is used to clean the front surface of the magnetic head.

SUMMARY OF THE INVENTION

In order to eliminate the troublesome cleaning operation which is manually performed an object of this invention is to provide a magnetic head device with a cleaning mechanism which can be manufactured at lower cost.

The foregoing object of the invention has been achieved by the provision of a magnetic head device with a cleaning mechanism which comprises: a head mounting stand including a head setting space in which a magnetic head is set, and tape guides for regulating the running of a magnetic tape; a lever which is swingably supported by a shaft on the upper surface of the rear end portion of the head mounting base; a cleaning member embedded in the inner surface of the front end portion of the lever which is bent; and a drive member engaged with the rear end portion of the lever to swing the lever, the cleaning member being slidably moved on the front surface of the magnetic head, wherein the shaft and the head mounting base are formed as one unit by molding.

In the magnetic head device with the cleaning mechanism according to the invention, the shaft and the head mounting stand are formed as one unit; in other words, the shaft is formed simultaneously when the head mounting stand is molded. Hence, the device is reduced in the number of components and accordingly in the number of manufacturing steps as much, with the result that the device is reduced in manufacturing cost.

BRIEF DESCRIPTION OF THE DRAWINGS

FIG. 1 (B) is a sectional view showing essential components of the magnetic head device of the second embodiment of the present invention;

DETAILED DESCRIPTION OF THE PREFERRED EMBODIMENTS

The invention will be described with reference to its preferred embodiments in detail.

Figure 2:
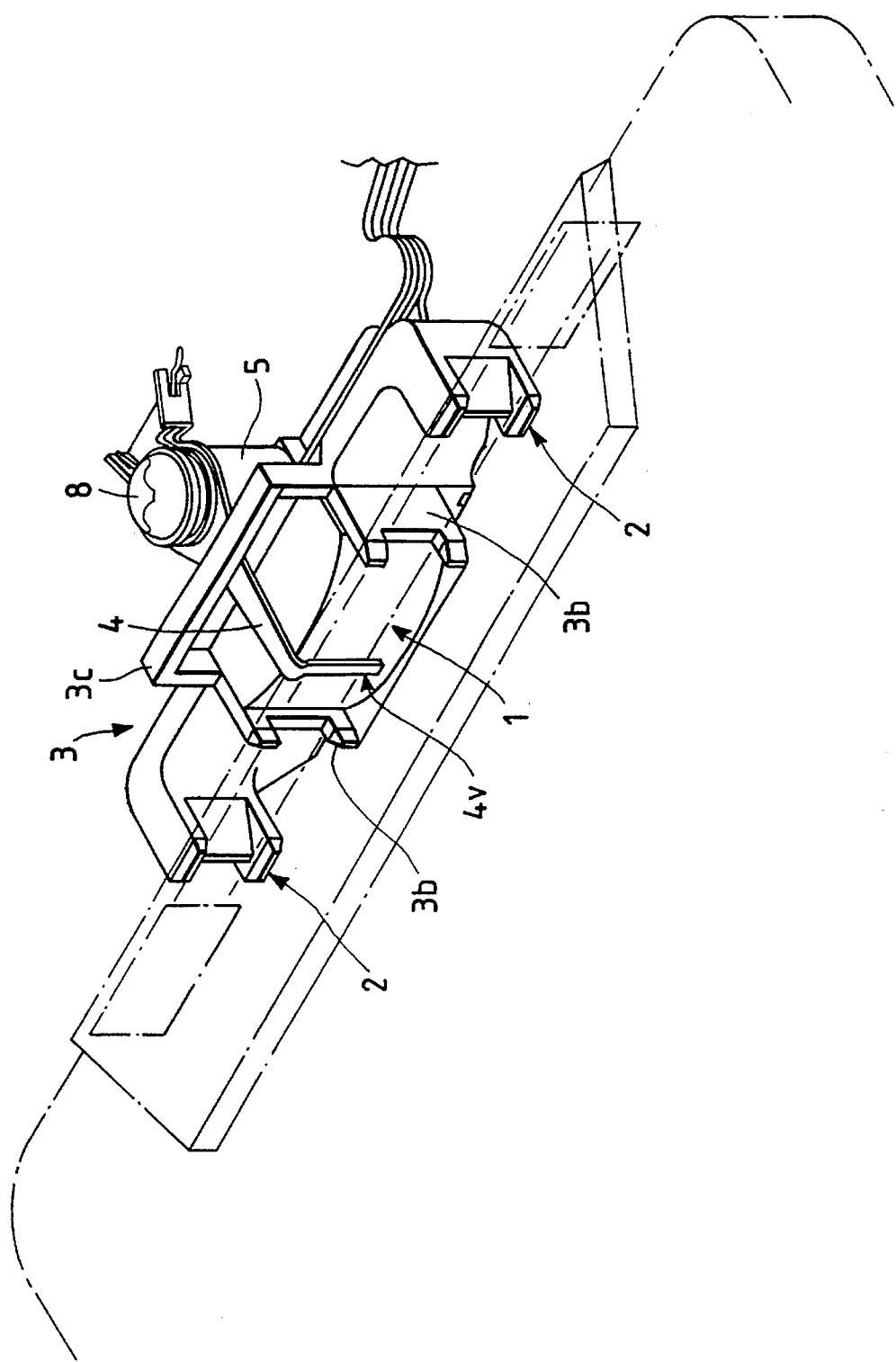
FIG. 2 is a perspective view showing a magnetic head device with a cleaning mechanism of a first embodiment of the present invention.

A first embodiment of the present invention shows a magnetic head device with a cleaning mechanism which is designed as shown in FIG. 2.

The magnetic head device has a head mounting stand 3 including right and left tape guides 2, and a head setting space in which a magnetic head 1 is set. A lever 4 with a cleaning brush is mounted on the head mounting stand 3 in such a manner that it is swingable about its rotatably supporting portion 5.

Figure 3:
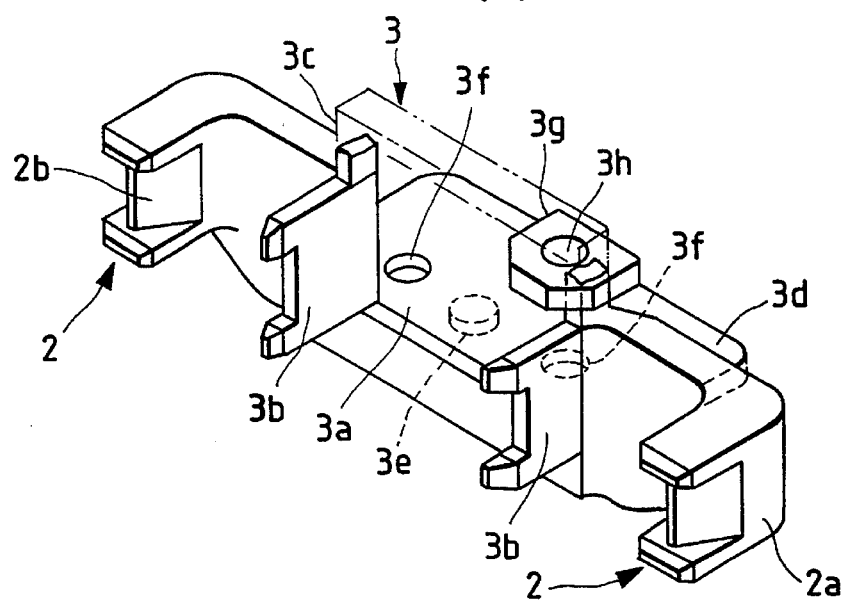
FIG. 3 is a perspective view of a head mounting stand in the magnetic head device shown in FIG. 2.

The head mounting stand 3, on which the magnetic head 1 is fixedly mounted, is formed by molding resin in such a manner that, as shown in FIG. 3, it is extended right and left from the head setting space 3a in which the magnetic head 1 is set. The head setting space 3a has a pair of right and left head guides 3b and 3b on the right and left sides which are extended forwardly to guide the magnetic head 1 into the head setting space 3a. The head mounting stand 3 is reinforced with a reinforcing part 3c provided above so that the head setting space 3a may not expand right and left by heat or stress.

The head mounting stand 3 has a mounting seat 3d which is extended backwardly from the lower end portion of the head mounting stand 3. In order to correctly position the head mounting stand 3, for instance, on a chassis, a positioning protrusion 3e is formed on the lower surface of the mounting seat 3d. The positioning protrusion 3e is inserted into a hole formed in the chassis. The mounting seat 3e further includes mounting through-holes 3f on both sides of the positioning protrusion 3e, and a step 3g at the middle of the rear end portion. The step 3g has a through-hole 3h into which a shaft 5 adapted to support the lever 4 is fixedly inserted.

The right and left tape guides 2, which are provided on the right and left sides of the head mounting stand 3 and are integral with the stand 3, include bent portions 2a and 2b which are protruded forwardly from the head mounting stand 3. In reproducing signals from the magnetic tape, the bent portions 2a and 2b are inserted into the small windows formed in the cassette half as indicated by the one-dot chain lines in FIG. 2. The bent portions 2a and 2b thus inserted guide the magnetic tape together with the head guides 3b and 3b, so that the magnetic tape passes over the magnetic head while being correctly controlled in position.

Figure 4:
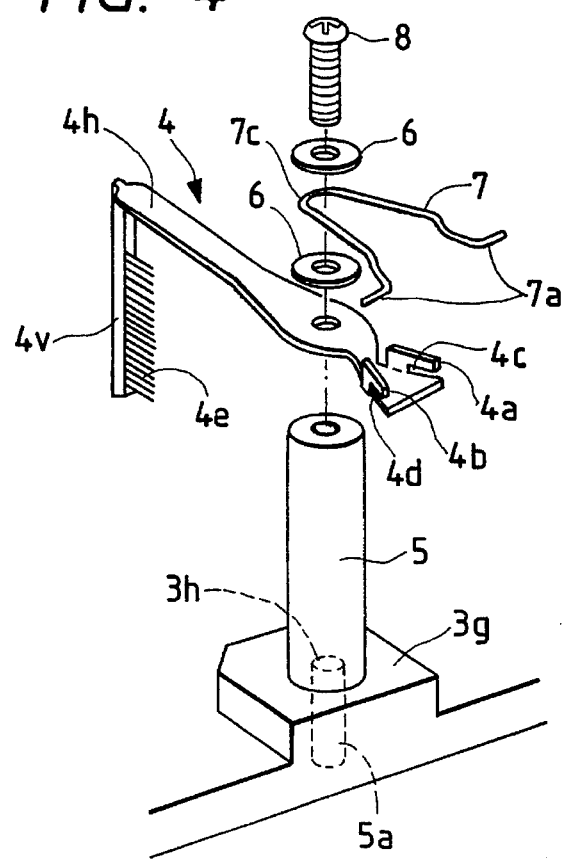
FIG. 4 is an exploded perspective view showing a cleaning lever and its mounting means.
Figure 5A:
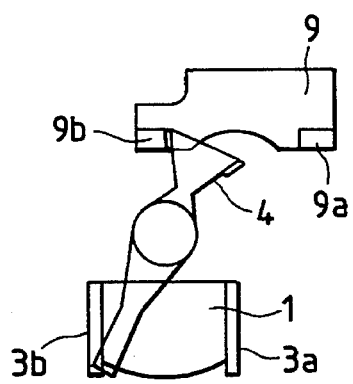
FIGS. 5 (A) to (F) are explanatory diagrams for a description of the operation of driving the lever.
Figure 5B:
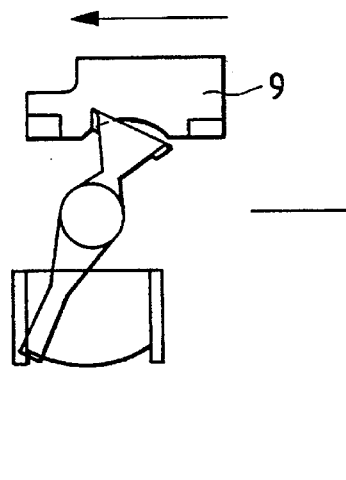
Figure 5C:
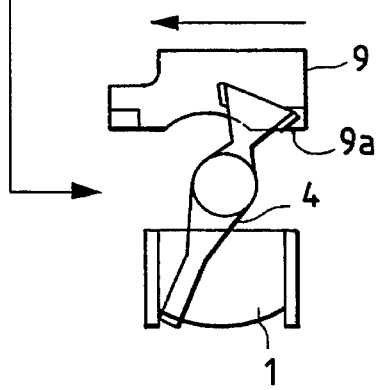
Figure 5D:
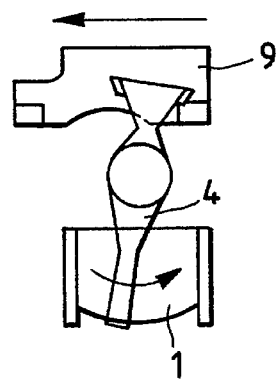
Figure 5E:
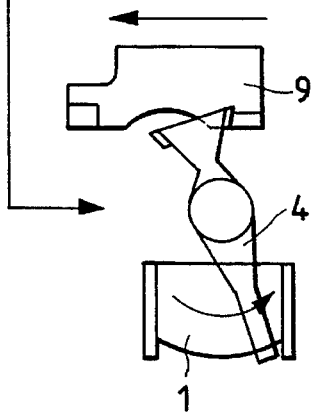
Figure 5F:
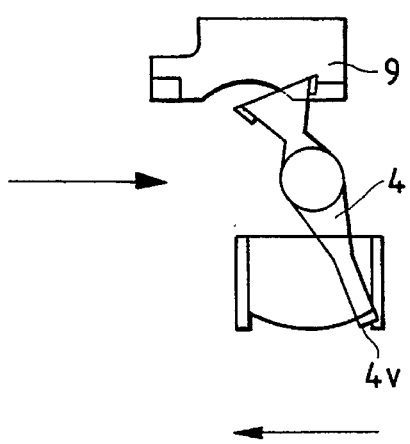

As shown in FIG. 4, the lever 4 is inverted-L-shaped, comprising a horizontal arm 4h and a vertical arm 4v, and the shaft 5 is fixedly inserted in the through-hole 3h formed in the step 3g. One free end portion of the horizontal arm 4h of the lever 4 is rotatably supported on the top of the shaft 5 with washers 6 and 6, a spring 7, and a screw 8. The end portion of the horizontal arm 4h which has been rotatably supported on the shaft 5, has ribs 4a and 4b raised on both sides. The ribs 4a and 4b have slits 4c and 4d into which both ends of the spring 7 are inserted.

The vertical arm 4h is extended downwardly being bent at the other end of the horizontal arm 4h. The vertical arm 4v has a brush 4e which is formed as follows: A bar, around which fibers such as Nylon fibers and carbon fibers are wound, is fixedly held on the vertical arm 4v, for instance, by caulking. The use of the brush 4e of carbon fibers contributes to prevention of the occurrence of static electricity. When mounted on the shaft 5, the lever 4 is extended forwardly through the gap between the upper surface of the magnetic head 1 and the reinforcing part 3c, and its brush 4e is in contact with the front surface of the magnetic head 1 as shown in FIG. 2.

It is preferable that the lever 4 is made by using a non-magnetic material such as austenite stainless steel so that it may not adversely affect the magnetic head 1. In addition, it is also preferable that, in order to discharge static electricity from the lever 4, the shaft 5, the washers 6 and 6, and the screw 8 are made of copper high in conductivity, and the shaft 5 has a leg 5a on the lower end face which leg is extended through the through-hole 3h of the step 3g until it is brought into contact with the chassis.

The spring 7 is substantially U-shaped, having two end portions 7a and 7b which are bent outwardly, in the opposite directions. With the spring 7 compressed, the two end portions 7a and 7b are inserted into the slits 4c and 4d formed in the ribs 4a and 4b of the lever 4 in such a manner that they are slightly extended outside the ribs 4a and 4b, respectively. With the middle portion 7c of the spring 7 held between the washers 6 and 6, the spring 7 is secured to the lever 4 with the screw 8.

The ribs 4a and 4b at the rear end of the lever 4 serve as stoppers for fixedly supporting the spring 7 near the ends, and as acting means which is pushed by a drive member 9. The drive member 9, as shown in FIGS. 5 (A) to (F), is reciprocated in the directions of the arrows by a drive source such as a tape driving motor (not shown) periodically or when required. The force for moving the drive member 9 may be obtained in various ways: That is, a magnetic tape driving motor may be employed; or in the case of a tape deck body of motor drive type, a tape loading motor may be used; or in the case of a tape deck of automatic reverse type, a mechanism may be utilized which moves the drive member 9 in association with the switching of the tape running direction. Furthermore, in order to allow manual operation, the force may be obtained from the operation of the push button provided on the front panel of the tape deck body.

Now, the cleaning of the above-described magnetic head device will be described.

For instance in the case where the head cleaning is carried out by turning the lever whenever the cassette ejecting operation is performed, the lever 4 is-turned as shown in FIGS. 5 (A) to (F).

In the case when a signal reproducing operation is carried out with the magnetic tape being run in the direction of the arrow in the part (A) of FIG. 5, the lever 4 has been swung to the left. Hence, the vertical arm 4v of the lever 4 is abutted against the left head guide 3b, and the magnetic head 1 is moved towards the cassette half (not shown), so that the magnetic tape is brought into contact with the front surface of the magnetic head 1.

After the signal reproducing operation, the tape cassette ejecting operation is carried out. In this operation, first the drive member 9 is moved to the left as shown in FIG. 5 (B), while the magnetic head 1 is retracted from the cassette half leaving the magnetic tape. The movements of the drive member 9 and the cassette half are continued until the rear end of the lever 4 is brought into contact with the right protrusion 9a of the drive member 9 as shown in FIG. 5 (C). This time instant is made to occur with the timing of ejecting the cassette half from the tape deck.

FIG. 5 (C) shows the magnetic head 1 which has been retracted. The drive member 9 is further moved to the left. As a result, the protrusion 9a pushes the rib 4a of the lever 4, thus turning the lever 4 counter-clockwise about the rotatably supporting portion 5. As the lever 4 is turned in the above-described manner, the brush 4e provided on the inner surface of the vertical arm 4v is slidably moved on the front surface of the magnetic head 1 to the right as shown in FIG. 5 (D) and (E), thus removing foreign matter such as dust, magnetic powder and oil from the front surface of the magnetic head 1.

The turning of the lever 4 is continued until it abuts against the right head guide 3b. In this operation, the spring 7 serves as shock absorbing means; that is, it damps the shock which is imparted to the vertical arm 4v when the arm 4v strikes against the right head guide 3b. The brush 4e on the inner surface of the vertical arm is set along the right edge of the front surface of the magnetic head 1. In order to start the next signal reproducing operation, the magnetic head 1 is moved forwardly, and the magnetic tape is run in the direction of the arrow in FIG. 5 (F).

As described above, the front surface of the magnetic head 1 is cleaned every time the cassette ejecting operation is carried out. Hence, the front surface of the magnetic head 1 which is kept clean at all times, is brought into contact with the magnetic tape. This means that the signals are reproduced with high fidelity.

On the other hand, there has been a strong demand for reduction in cost of the magnetic head device with the cleaning mechanism, and a variety of technical improvements have been given to it. In the above-described conventional magnetic head device, the shaft 5, which rotatably supports the lever 4 having the brush 4e, is of brass. Therefore, the device is relatively high in material cost. Furthermore, in the device, the step 3g is formed on the middle of the rear end portion of the head mounting stand 3, and the shaft 5 rotatably supporting the lever 4 is fixedly inserted into the through-hole 3h formed in the step 3g. Hence, the magnetic head device is relatively large in the number of components and accordingly in the number of manufacturing steps, which results in an increase in manufacturing cost.

In view of the foregoing, a second embodiment of the present invention is to provide a magnetic head device with a cleaning mechanism which can be manufactured at lower cost.

Figure 1:
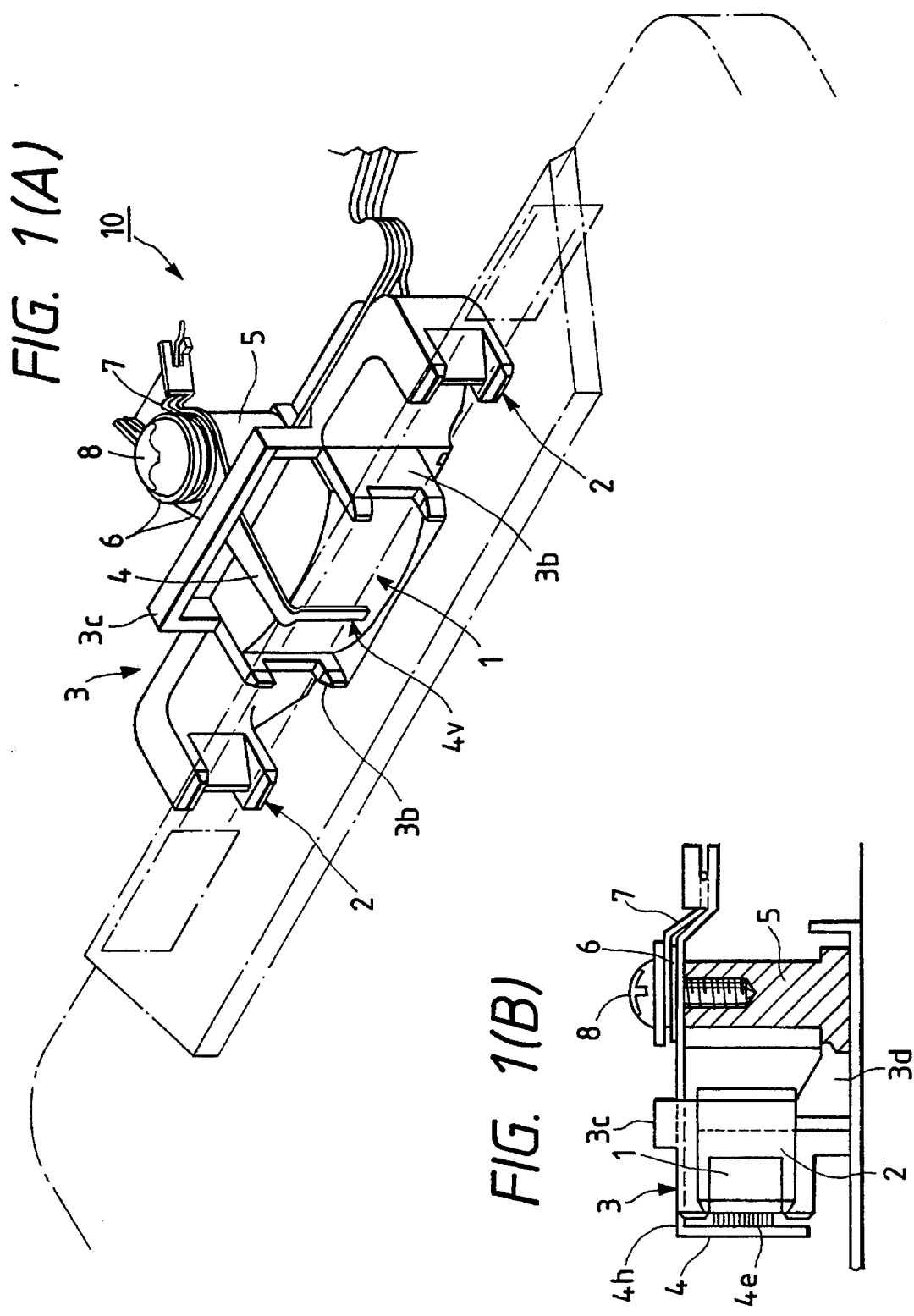
FIG. 1 (A) is a perspective view showing the magnetic head device of the second embodiment of the present invention.

FIGS. 1 (A) and (B) show the second embodiment of a magnetic head device with a cleaning mechanism which constitutes the embodiment of the invention, in which parts corresponding functionally to those which have been described with reference to the first embodiment shown in FIGS. 2 through 5 are therefore designated by the same reference numerals or characters.

A magnetic head device 10 has a head mounting stand 3 which is formed by molding resin. The head mounting stand 3 includes a head setting space in which a magnetic head 1 is set, and a pair of tape guides 2. A lever 4 with a cleaning brush 4e is rotatably provided on the head mounting stand 3 in such a manner that it is swingable about its rotatably supporting portion 5. A mounting seat 3d is extended backwardly from the lower end portion of the head mounting stand 3 on which the magnetic head is fixedly mounted. A shaft 15 adapted to rotatably support the lever 4 is formed by molding for instance PPS resin in such a manner that it is integral with the head mounting stand 3 and is located at the middle of the rear end portion of the stand 3. The shaft 15 has a threaded hole in the top end face to rotatably support the lever 4. Similarly as in the case of the conventional head cleaning mechanism, the horizontal arm 4h of the inverted-L-shaped lever 4 is rotatably mounted on the top of the shaft 15 with washers 6 and 6, a spring 7 and a screw 8.

As described above, in the magnetic head device with the cleaning mechanism according to the invention, the shaft 15 rotatably supporting the lever 4 is molded integral with the head mounting stand 3. Hence, the number of components is decreased as much, and accordingly the number of manufacturing steps, with the result that the magnetic head device with the cleaning mechanism is low in manufacturing cost. The formation of the shaft 15 and the head mounting stand 3 as one unit by molding contributes to an improvement in dimensional accuracy of the magnetic head device.

As was described above, the magnetic head device with the cleaning mechanism according to the invention is reduced in the number of components and accordingly in the number of manufacturing steps, and therefore it can be manufactured at low cost, yet it is improved in dimensional accuracy.

What is claimed is:

1. A magnetic head device with a cleaning mechanism, comprising:
    a head mounting stand including a head setting space in which a magnetic head is set, and tape guides for regulating a running of a magnetic tape;
    a cleaning device slidably moved on a front surface of the magnetic head, the cleaning device swingably supported by a shaft mounted on the head mounting stand, said shaft and said head mounting stand being integrally formed; and
    a drive member engaged with a rear end portion of the cleaning device to swing the cleaning device,
    wherein the shaft and the head mounting stand are formed as one unit by molding and wherein said shaft is formed simultaneously when said head mounting stand is molded,
    said head mounting stand and said shaft being formed of a same material.

2. A magnetic head device as claimed in claim 1, wherein the cleaning device includes:
    a lever swingably supported by the shaft; and
    a cleaning member embedded in art inner surface of a front end portion of the lever, said lever being bent.

3. A magnetic head device according to claim 2, wherein said shaft comprises PPS resin.

4. A magnetic head device as claimed in claim 1, wherein the shaft is mounted on an upper surface of the rear end portion of the head mounting stand.

5. A magnetic head device according to claim 4, wherein said shaft comprises PPS resin.

6. A magnetic head device according to claim 1, wherein said shaft comprises PPS resin.

7. A magnetic head device, comprising:
    a head mounting stand including a head setting space in which a magnetic head is set, and tape guides for regulating a running of a magnetic tape;
    a cleaning device slidably movable on a front surface of the magnetic head and being swingably supported by a shaft mounted on the head mounting stand, the cleaning device including a lever swingably supported by the shaft and a cleaning member embedded in an inner surface of a front end portion of the lever, said shaft and said head mounting stand being integrally formed; and
    a drive member engaged with a rear end portion of the lever to swing the lever,
    wherein the shaft and the head mounting stand are formed in one unit by molding and wherein said shaft is formed simultaneously when said head mounting stand is molded,
    said head mounting stand and said shaft being formed of a same material.

* * * * *